(12) United States Patent
Zander et al.

(10) Patent No.: US 10,362,594 B2
(45) Date of Patent: Jul. 23, 2019

(54) SCHEDULING IN CELLULAR NETWORKS

(71) Applicant: SONY MOBILE COMMUNICATIONS INC., Tokyo (JP)

(72) Inventors: Olof Zander, Sodra Sandby (SE); Basuki Priyanto, Lund (SE); Vanja Plicanic Samuelsson, Lund (SE); Rickard Ljung, Helsingborg (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/128,980

(22) Filed: Sep. 12, 2018

(65) Prior Publication Data
US 2019/0014590 A1 Jan. 10, 2019

Related U.S. Application Data

(60) Division of application No. 14/806,319, filed on Jul. 22, 2015, now Pat. No. 10,111,247, which is a (Continued)

(51) Int. Cl.
*H04W 72/00* (2009.01)
*H04W 72/12* (2009.01)
(Continued)

(52) U.S. Cl.
CPC ......... *H04W 72/1278* (2013.01); *H04W 4/06* (2013.01); *H04W 72/04* (2013.01); *H04W 74/08* (2013.01)

(58) Field of Classification Search
CPC .. H04B 7/2621; H04B 7/2656; H04B 7/2606; H04B 7/15542; H04B 1/56; H04B 1/50;
(Continued)

(56) References Cited

U.S. PATENT DOCUMENTS

| 7,957,347 B1 | 6/2011 | Loc |
| 2002/0034956 A1 | 3/2002 | Mekuria |

(Continued)

FOREIGN PATENT DOCUMENTS

| EP | 2612519 A1 | 7/2013 |
| EP | 2670206 A1 | 12/2013 |
| WO | 2010006649 A1 | 1/2010 |

OTHER PUBLICATIONS

[No Author Listed], Discussion on UE-to-Network Relays operation, CATT, 3GPP TSG RAN WGI Meeting #80bis, Belgrade, Serbia, Apr. 20-24, 2015, Document No. R1-151353, 4 pages.

(Continued)

*Primary Examiner* — Dai Phuong
(74) *Attorney, Agent, or Firm* — Tucker Ellis LLP

(57) ABSTRACT

First reoccurring resources on a radio interface of a cellular network (100) are allocated and shared between communication devices (121-125) assigned to a first set (151). Second reoccurring resources on the radio interface are allocated and shared between communication devices (121-125) assigned to a second set (152). A control message is sent, the control message indicating the first reoccurring resources and the second reoccurring resources. The control message may optionally be sent employing a broadcast transmission (110).

11 Claims, 7 Drawing Sheets

Related U.S. Application Data continuation of application No. PCT/EP2015/056553, filed on Mar. 26, 2015.

(51) Int. Cl.
*H04W 4/06* (2009.01)
*H04W 72/04* (2009.01)
*H04W 74/08* (2009.01)

(58) Field of Classification Search
CPC ...... H04B 1/52; H04B 72/0446; H04B 84/12; H04B 7/2643; H04B 74/04; H04B 7/212; H04B 7/2123
USPC ........ 455/432.1–453, 456.1–456.3, 420–421
See application file for complete search history.

(56) References Cited

U.S. PATENT DOCUMENTS

| | | |
|---|---|---|
| 2002/0128017 A1 | 9/2002 | Virtanen |
| 2003/0072274 A1 | 4/2003 | Futakata et al. |
| 2003/0093485 A1 | 5/2003 | Dougall et al. |
| 2003/0103492 A1 | 6/2003 | Tanimoto |
| 2004/0057407 A1 | 3/2004 | Balachandran et al. |
| 2004/0198345 A1 | 10/2004 | Farber et al. |
| 2005/0226198 A1* | 10/2005 | Barak ............... H04B 7/265 370/345 |
| 2008/0225783 A1 | 9/2008 | Wang et al. |
| 2008/0300004 A1 | 12/2008 | Balachandran et al. |
| 2009/0034506 A1 | 2/2009 | Wijayanathan et al. |
| 2009/0201846 A1 | 8/2009 | Horn et al. |
| 2011/0117907 A1 | 5/2011 | Hooli et al. |
| 2011/0134827 A1 | 6/2011 | Hooli et al. |
| 2011/0235571 A1 | 9/2011 | Seo et al. |
| 2011/0264977 A1 | 10/2011 | Chen et al. |
| 2012/0142363 A1 | 6/2012 | Elmaleh et al. |
| 2012/0208583 A1 | 8/2012 | Chung et al. |
| 2013/0005329 A1 | 1/2013 | Kawasaki |
| 2013/0022029 A1* | 1/2013 | Ryu ............... H04W 72/042 370/336 |
| 2013/0163508 A1 | 6/2013 | Yu et al. |
| 2013/0190000 A1 | 7/2013 | Boudreau et al. |
| 2014/0010212 A1 | 1/2014 | McNamara et al. |
| 2014/0171062 A1 | 6/2014 | Fallgren et al. |
| 2014/0321367 A1 | 10/2014 | Marupaduga et al. |
| 2015/0029866 A1 | 1/2015 | Liao et al. |
| 2015/0189645 A1 | 7/2015 | Maeda et al. |
| 2015/0223263 A1* | 8/2015 | Soong ............... H04B 7/2606 370/315 |
| 2015/0237649 A1 | 8/2015 | Zhang et al. |
| 2016/0050075 A1* | 2/2016 | Rubin ............... H04B 7/26 455/408 |
| 2016/0219596 A1 | 7/2016 | Yanover et al. |
| 2016/0286576 A1 | 9/2016 | Zander et al. |
| 2017/0013643 A1 | 1/2017 | Nan et al. |
| 2017/0085573 A1 | 3/2017 | Zhang et al. |
| 2017/0332360 A1* | 11/2017 | Morioka ........... H04W 72/1289 |
| 2018/0167176 A1* | 6/2018 | McNamara ........... H04L 5/0007 |

OTHER PUBLICATIONS

Zhang et al., Performance Analysis of Scheduling Algorithms in the Relay-Aided Cellular Networks, 2010 International Conference on Communications, Circuits and Systems (ICCCAS), IEEE, Jul. 2010, pp. 122-125, doi: 10.1109/ICCCAS.2010.5582029.

International Search Report and Written Opinion dated Nov. 26, 2015 in connection with International Application No. PCT/EP2015/056553.

International Search Report and Written Opinion dated Dec. 7, 2015 in connection with International Application No. PCT/EP2015/056375.

International Search Report and Written Opinion dated May 30, 2016 in connection with International Application No. PCT/EP2015/070348.

[No Author Listed], 3GPP TR 23.713 VI.0.0 (Feb. 2015), 3ra Generation Partnership Project; Technical Specification Group Services and System Aspects; Study on extended architecture support for proximity-based services (Release 13), 59 pages.

[No Author Listed], 3GPP TS 23.401 V13.2.0 (Mar. 2015), 3ra Generation Partnership Project; Technical Specification Group Services and System Aspects; General Packet Radio Service (GPRS) enhancements for Evolved Universal Terrestrial Radio Access Network (E-UTRAN) access (Release 13), 313 pages.

[No Author Listed], 3GPP TS 24.008 V13.I.0 (Mar. 2015), 3rd Generation Partnership Project; Technical Specification Group Core Network and Terminals; Mobile radio interface Layer 3 specification; Core network protocols; Stage 3 (Release 13), 714 pages.

Chu et al., Adaptive Modulation and Coding with Queue Awareness in Cognitive Incremental Decode-and-Forward Relay Networks, Cognitive Radio and Networks Symposium, IEEE ICC 2014; pp. 1453-1459.

Wang et al., Adaptive Relaying Method Selection for Multi-Rate Wireless Networks with Network Coding, IEEE Communication Letters, Dec. 2012;16(12)2004-7.

* cited by examiner

SCHEDULING IN CELLULAR NETWORKS

CROSS-REFERENCE TO RELATED APPLICATION

This application is a divisional application claiming the benefit of U.S. patent application Ser. No. 14/806,319, filed Jul. 22, 2015, which is a continuation application of International Application No. PCT/EP2015/056553, filed Mar. 26, 2015, the disclosures of which are incorporated herein by reference in their entireties.

TECHNICAL FIELD

Various embodiments relate to a device and a method. In particular, various embodiments relate to techniques of allocating, for different sets of communication devices, resources on a radio interface of a cellular network.

BACKGROUND

With the ever increasing number of communication devices or user equipments (UEs) connected to cellular networks, also the amount of traffic on radio interface of cellular networks is expected to grow further. In particular, with respect to machine type communication (MTC), it is possible that—while the overall traffic increases—the amount of traffic per device decreases.

In such a scenario, employing shared reoccurring resources on the radio interface is a viable option to handle the increasing traffic. Typically the shared reoccurring resources are prospectively allocated to a plurality of communication devices connected to the cellular network and are persistent for a certain period of time.

However, typically employing shared radio resources causes an increased likelihood of collisions. Collision can increase latency of transmission, increase a need for control signaling, and can, therefore, reduce the overall user experience.

SUMMARY

Therefore, a need exists for advanced techniques of employing reoccurring resources on the radio interface. In particular, a need exists for techniques that allow to flexibly schedule resources for a large number of UEs—while, at the same time, a likelihood of collisions is kept comparatively small.

According to an embodiment of the invention, a device is provided. The device comprises a wireless interface. The wireless interface is configured to transmit data on a radio interface of a cellular network. The device further comprises at least one processor. The at least one processor is configured to allocate first reoccurring resources on the radio interface shared between UEs assigned to a first set. The at least one processor is further configured to allocate second reoccurring resources on the radio interface shared between UEs assigned to a second set. The at least one processor is configured to send, via the wireless interface, at least one control message. The at least one control message indicates the first reoccurring resources and the second reoccurring resources.

According to a further embodiment, a method is provided. The method comprises allocating first reoccurring resources on a radio interface of a cellular network. The first reoccurring resources are shared between UEs assigned to a first set. The method further comprises allocating second reoccurring resources on the radio interface. The second reoccurring resources are shared between UEs assigned to a second set. The method further comprises sending at least one control message indicating the first reoccurring resources and the second reoccurring resources.

According to a further embodiment, a device is provided. The device comprises a wireless interface configured to transmit data on a radio interface of a cellular network. The device further comprises at least one processor. The at least one processor is configured to receive, via the wireless interface, at least one control message. The at least one control message indicates first reoccurring resources associated with a first set of UEs and second reoccurring resources associated with a second set of UEs. The at least one control message further indicates at least first set classification information for the first set. The first set classification information parameterizes assignment of UEs to the first set. The at least one processor is further configured to selectively select the first reoccurring resources based on the first set classification information.

According to a further embodiment, a method is provided. The method comprises receiving at least one control message indicating first reoccurring resources associated with a first set of UEs, second reoccurring resources associated with a second set of UEs, and at least first set classification information for the first set. The first set classification information parameterizes assignment of UEs to the first set. The method further comprises selectively selecting the first reoccurring resources based on the first set classification information.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1:
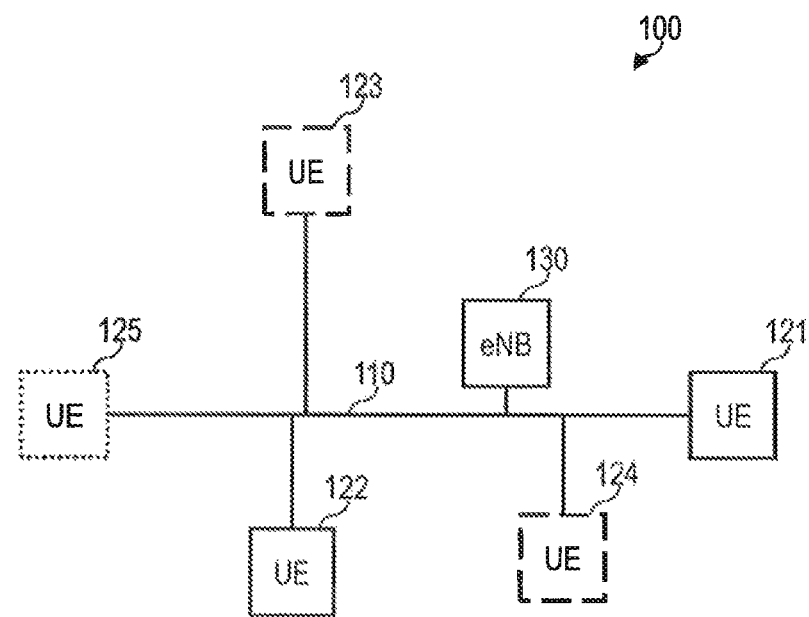
FIG. 1 is a schematic illustration of a cellular network providing data transmission with UEs via a radio interface, the cellular network implementing techniques according to various embodiments.
Figure 1:
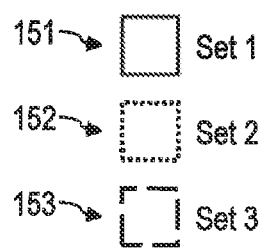

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques are explained of providing shared resources to UEs connected to a cellular network. In particular, different shared resources are provided for different groups or sets of UEs. This mitigates collision and interference between the different UEs. By sharing the resources, the spectrum may be effectively utilized which allows to connect a larger number of UEs to the cellular network.

The grouping of the UEs into the sets can be done based on various decision criteria that allow optimizing reusing of the shared resources between the different UEs. In particular, it is possible to do the grouping in a manner that reduces a likelihood of collisions. For this, one or more properties of the UEs can be taken into account, such as their categories, features, capabilities, traffic pattern, etc. E.g., UEs of different or same capabilities can be assigned to a given set. E.g., UEs having complementary traffic patterns or the same traffic patterns or different traffic patterns can be assigned to a given set. Of course, variations of such decision criteria are possible.

Now referring to FIG. 1, a cellular network 100 is shown. The cellular network 100 comprises an access node 130. While, generally, the various techniques explained hereinafter can be readily applied to different kinds and types of cellular networks, for illustrative purposes hereinafter reference primarily to the cellular network 100 operating according to the $3^{rd}$ Generation Partnership Project (3GPP) Long-Term Evolution (LTE) standards will be made. Because of this, in FIG. 1 the access node 130 is labeled as evolved node B (eNB). Such techniques may also be applied to radio interfaces operating according to the 3GPP Universal Mobile Telecommunications System (UMTS) technology, etc.

As can be seen from FIG. 1, five UEs 121-125 are connected to the cellular network 100. Generally, the cellular network 100 supports, both, unicast transmission between the eNB 130 and any of the UEs 121-125, as well as broadcast transmission 110 between any one of the eNB 130 and the UEs 121-125, and all or subsets of the other network devices 121-125, 130.

In the scenario of FIG. 1, the various UEs 121-125 are assigned to different sets 151-153. For each set, distinct reoccurring resources 261-263 are provided on the radio interface 200 of the cellular network 100 (cf. FIG. 2). For example, the different reoccurring resources 261-263 of the different sets 151-153 can use different time-frequency resource allocation 210.

In particular, the reoccurring resources 261-263 are prospectively allocated by the eNB 130 to the different UEs 121-125 assigned to the different sets 151-153. This means that for a certain future time period the resources 261-263 are persistent. If a give one of the UEs 121-125 needs to transmit data after the reoccurring resources 261-263 have been allocated, the given UE 121-125 can readily transmit the data on the available resources and, in particular, does not need to send a dedicated scheduling request and wait for receiving a dedicated scheduling grant first.

While, generally, such techniques as explained herein can be applied to uplink (UL) transmission and downlink (DL) transmission, such techniques might find particular application in UL transmission in order to reduce latency.

A typical scenario in MTC networks is that each UE 121-125 only has a comparably small amount of data to transmit, e.g., in the order of 0.5 MB or less. Thus, the shared reoccurring resources are not blocked long for transmission of each individual UE 121-125. Thus, bandwidth usage can benefit from schemes of providing shared resources.

Figure 2:
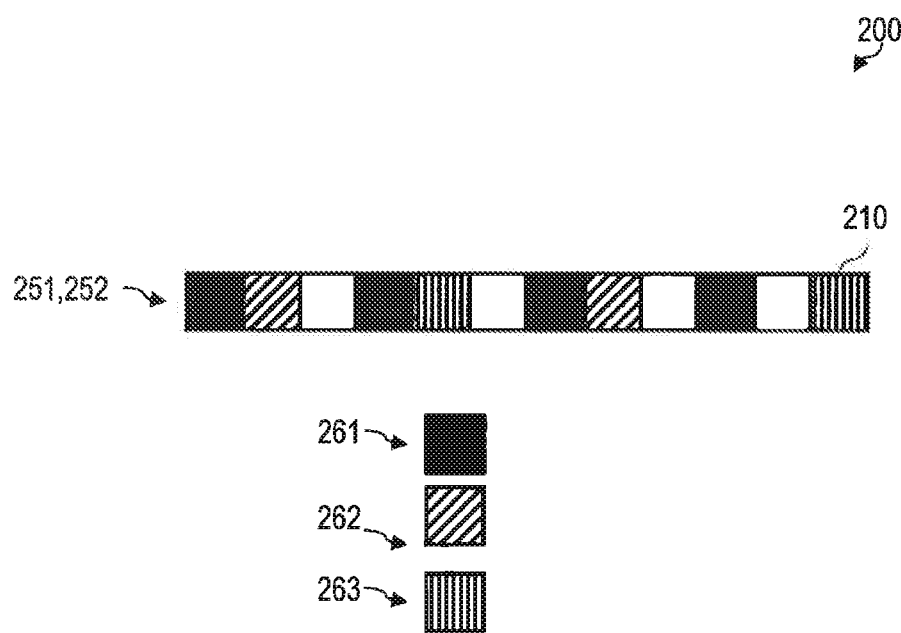
FIG. 2 schematically illustrates logical resources allocated on the radio interface of the cellular network.

Generally, reoccurring resources 261-263 can be allocated on a data channel 251 of the radio interface 200 and/or can be allocated on a control channel 252 of the radio interface 200. In the scenario of FIG. 2—which is a logical view of the resource allocations—the reoccurring resources 261-263 are allocated on a control channel 252. E.g., it is possible that the control channel 252 is a random access control channel 252 that is reserved for attach messages of UEs 121-125 that are connecting to the cellular network 100, i.e., for connection setup.

Generally, it is possible that the reoccurring resources 261-263 associated with different sets 151-153 comprise a larger or smaller number of time-frequency resource allocations 210, are scheduled more often/less frequently, and/or in different frequency bands, etc. The reoccurring resources 261-263 can be generally scheduled with a fixed periodicity or having variable time intervals in-between.

Figure 3:
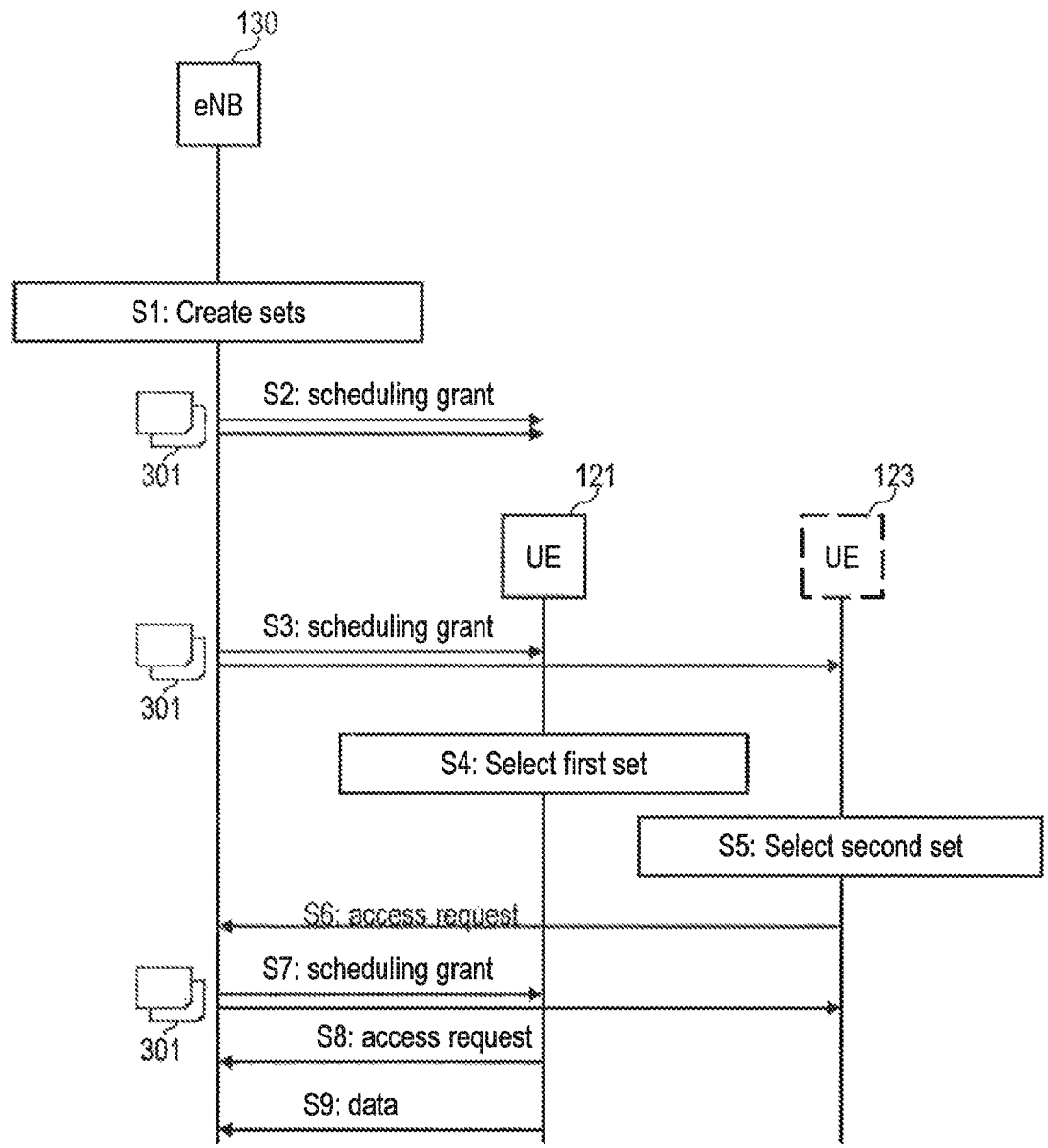
FIG. 3 is a signaling diagram according to various embodiments, wherein decision logic for selecting between reoccurring resources on a control channel resides within UEs.

A scenario of the reoccurring resources 261-263 being allocated on a control channel for connection setup is illustrated in the signaling diagram of FIG. 3. At S1, the eNB 130 creates a first set 151 and a second set 152; creating of the first set 151 and of the second set 152 includes allocating first reoccurring resources 261 on the radio interface 200 and allocating second reoccurring resources 262 on the radio interface 200. Further, the eNB 130 at S1 establishes set classification information 301 for the first set 151 and for the second set 152. E.g., the set classification information 301 may specify when to select the first set 151 and when to select the second set 152, i.e., may parameterize assignment of UEs 121-125 to the first set 151 and the second set 152. It is also possible that first set classification information 301 for the first set 151 is established and that, furthermore, second set classification information 301 for the second set 152 is established. The first set classification information 301 may parameterize assignment of UEs 121-125 to the first set. Likewise, the second set classification information 301 may parameterize assignment of UEs 121-125 to the second set 152. The set classification information 301 provides the decision criterion for selecting between the sets 151, 152. The set classification information 301 parameterizing such properties of the UEs 121-125 and explained above can correspond to: indicating, in the set classification information 301, a particular value of the property that a given UE 121-125 needs to fulfill to be assigned to the group; and/or indicating, in the set of classification information 301, a range of values of the property that a given UE 121-125 needs to fulfill to be assigned to the group.

In the scenario of FIG. 3, the reoccurring resources 261 and the second reoccurring resources 262 are allocated on the random-access control channel 252 that is reserved for attach messages. In order to inform UEs 121-125 that intend to attach or transmit data to the cellular network 100 about the first reoccurring resources 261 and the second reoccurring resources 262, the eNB 130 broadcasts a scheduling grant S2. The broadcasted scheduling grant S2 can be received by all UEs 121-125 within range; the UEs 121-125 need to be connected to the cellular network 100. As can be seen from FIG. 3, at the time that the eNB 130 broadcasts the scheduling grant S2 the UEs 121, 123 have not initialized/are not within range and do not receive the scheduling grant S2.

However, the eNB 130 is configured to broadcast corresponding scheduling grants from time to time, e.g., at a given periodicity or randomly. The next broadcasted scheduling grant S3 is received by the UE 121 and the UE 123. The scheduling grant S3 includes the first set classification information and the second set classification information 301. This enables the first UE 121 and the UE 123 to select between the first reoccurring resources 261 and the second reoccurring resources 262, respectively, based on the received first set classification information and the second set classification information 301. In particular, the first set classification information 301 can parameterize a property of the UEs 121, 123, e.g., by specifying an acceptable range of that property associated with the respective set 151, 152.

Then, the UEs 121, 123 can be configured to determine a current value of that property. The current value of that property can be compared against the indicated property of the scheduling grant 33. If the current value fulfills the parameterized property, the UE 121 can select the first set 151 at S4. If however the current value does not fulfill the parameterized property of the first set classification information 301, the UE 121 could select the second set 152; and/or optionally proceed to check whether the current value of the property fulfills the indicated property of the second set classification information 301 (not illustrated in FIG. 3). Likewise, at S5, the UE 123 selects the second set 152 as it finds that the current value of the property matches with the property as indicated by the second set classification information 301 of the scheduling grant 33.

As can be seen from the above, the UEs 121, 123 are scheduled in different reoccurring resources 261, 262. Because of this, the UE 123 sends an access request S6 in the second reoccurring resources 262; the UE 121 sends an access request S8 in the first reoccurring resources 261. As can be seen from FIG. 3, the access request S6 and the access request S8 are sent in different time slots—due to the different reoccurring resources 261, 262—and therefore collision is avoided.

The eNB 130 proceeds to broadcast scheduling grant at S7. At S9, the UE 121 now registered with the cellular network 100 sends data on the data channel 252. For this, dedicated resources may have been requested and/or granted (not shown in FIG. 3).

In the scenario that has been described above with respect to FIG. 3, the decision logic for creating the sets 151-153 resides at the network side of the cellular network 100, i.e., in the eNB 130 (S1). However, the decision logic for assigning a specific UE 121-125 to a given set 152-153 does not reside in the network side of the cellular network 100, but within the individual UEs 121-125 (S4, S5).

Figure 4:
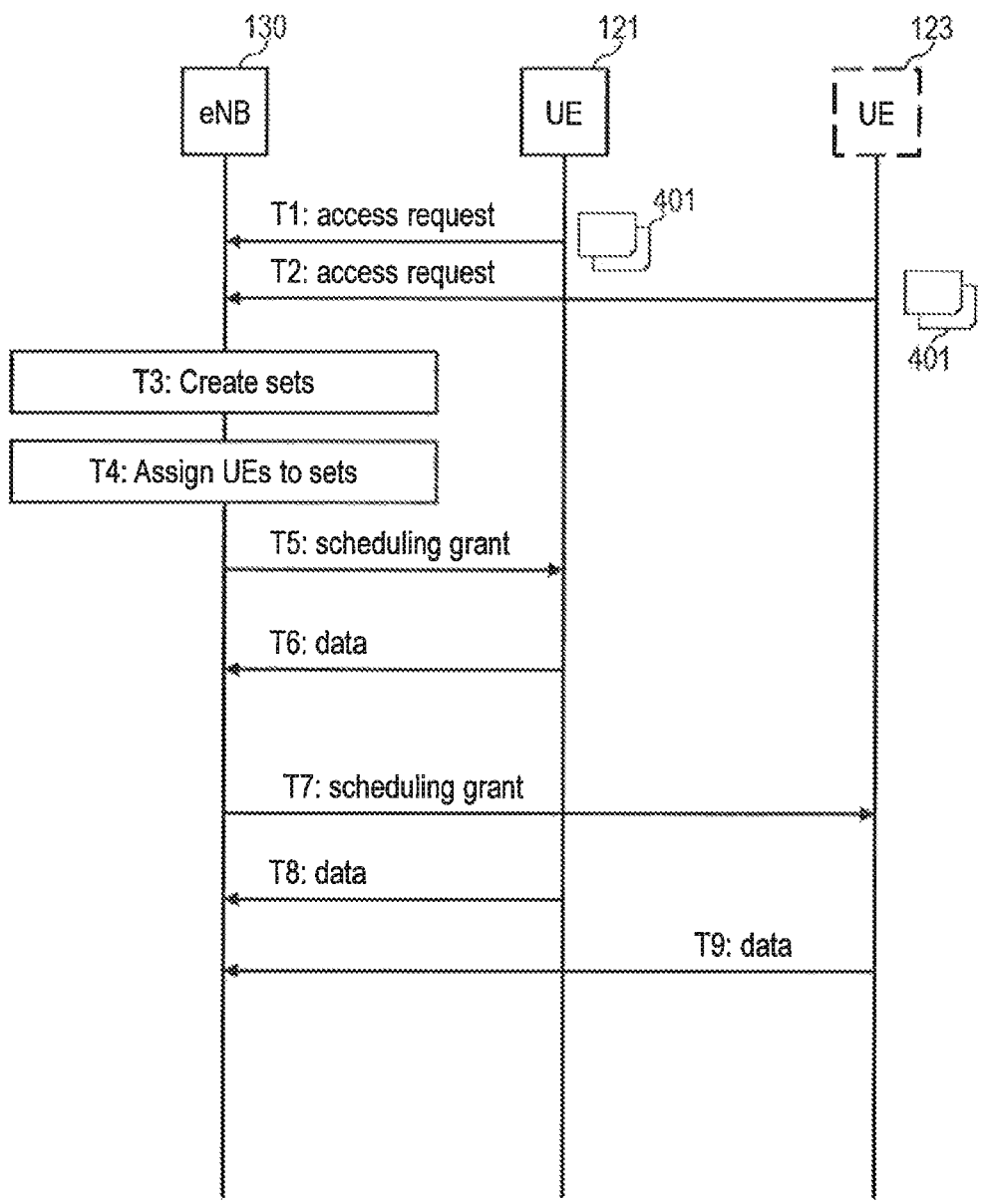
FIG. 4 is a signaling diagram according to various embodiments, wherein decision logic for selecting between reoccurring resources on a data channel resides within a network-side of the cellular network.

In FIG. 4, a scenario is shown where the decision logic for creating the sets 151-153 resides at the network side of the cellular network 100, i.e., in the eNB 130; likewise, the decision logic for assigning a specific UE 121-125 to a given set 151-153 also resides at the network side of the cellular network 100, i.e., in the eNB 130.

First, the UE 121 sends an access request T1 to the eNB 130, e.g. employing a legacy random-access channel. The access request T1 also includes a current value 401 of a property of the UE 121. Generally, the current value 401 may have been determined by measurement, channel sensing, approximation, retrieving data from a memory of the UE 121 etc. some time prior to sending of the access request T1. Also the UE 123 send an access request T2 employing the legacy random-access channel. Also the access request T2 indicates a current value 401 of the property of the UE 123.

Next, at T3, the eNB 130 creates the sets 151, 152. Because the eNB 130 has been informed about the current values 401 of the properties of the UEs 121, 123, the eNB 130 has the information required to also assign the UEs 121, 123 to the previously created sets 151, 152. This occurs at T4. E.g., at T4, the eNB 130 can compare set classification information 301 that parameterizes a property of the UEs 121-125 for the first set 151 and the second set 152 with the previously received current value 401 of that property. Because at T4 the eNB 130 determines that the current value 401 of the property matches with the property as indicated by the set classification information 301 for the first set 151, it assigns the UE 121 to the first set 151. Then, the eNB 130 sends a scheduling grant T5 to the UE 121. The scheduling grant T5 indicates the first reoccurring resources 261 associated with the UEs in the first set 151.

In the scenario of FIG. 4, the first reoccurring resources 261 are allocated on the data channel 251. It is then possible for the UE 121 to send payload data T6, T8 employing the first reoccurring resources 261. Because the first reoccurring resources 261 have been prospectively scheduled, the UE 121 does not need to send a dedicated scheduling request every time new data arrives in an uplink transmission buffer and is scheduled for UL transmission. Latency is reduced.

At T4, the eNB 130 also assigns the UE 123 to the second set 152 based on the set classification information 301. The eNB 130 sends a scheduling grant T7 to the UE 123. The scheduling grant T7 indicates the second reoccurring resources 262. The UE 123 can then send data T9 to the eNB 130 as UL transmission employing the second reoccurring resources 262.

In the scenario of FIG. 4, the scheduling grants T5, T7 are sent employing a unicast transmission on a downlink control channel.

Figure 5:
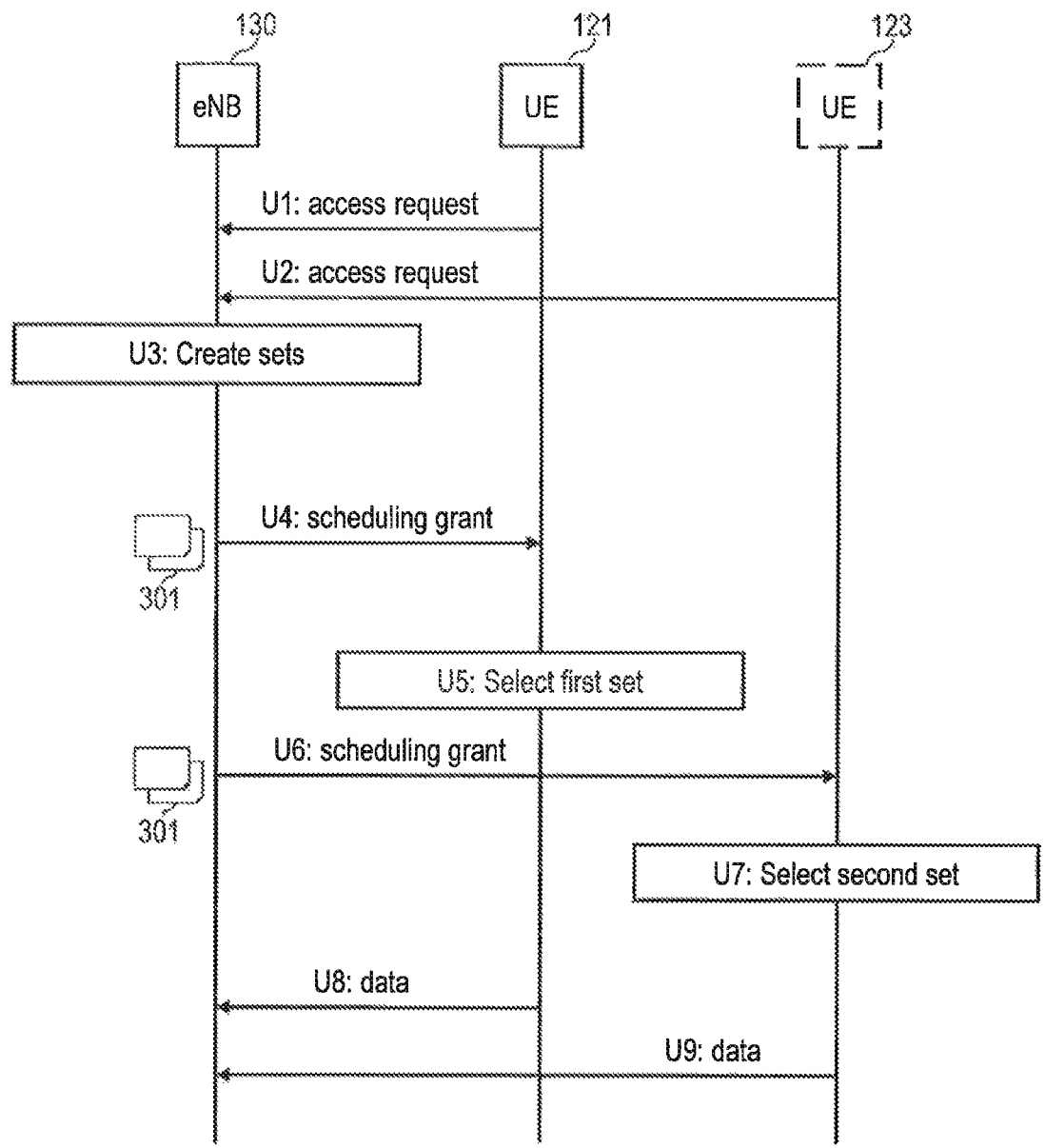
FIG. 5 is a signaling diagram according to various embodiments, wherein decision logic for selecting between reoccurring resources on a data channel resides within UEs.

Now turning to FIG. 5, a scenario is illustrated where the decision logic for creating the different sets 151-153 resides at the network side of the cellular network 100, e.g., at the eNB 130; while the decision logic for assigning the different UEs 121-125 to the sets 151, 152 resides at the UEs 121-125. Also in the scenario of FIG. 5, the reoccurring resources 261-263 are allocated on the data channel 251 and can be utilized to send payload data, e.g., of higher layers.

U1-U3 are equivalent to T1-T3 as in FIG. 4. The eNB 130 sends a scheduling grant U4 that includes the set classification information 301. The scheduling grant U4 is sent in a unicast transmission to the UE 121 and employing a control channel. Based on the set classification information 301, the UE 121 selects the first set 151 and sends data U8 employing the first reoccurring resources 261.

Further, the eNB 130 sends a scheduling grant U6 including the set classification information 301. The scheduling grant U6 is sent in a unicast transmission to the UE 123 and employing the downlink control channel. At U7, the UE 123 selects the second set 152 based on the set classification information 301 and sends data U9 employing the second reoccurring resources 262.

In the above scenarios, embodiments have been explained where a single UE 121, 123 is assigned to the first and second set 151, 152, respectively; in general it should be understood that each set 151-153 can comprise a plurality of UEs 121-125. In particular, those UEs 121-125 assigned to the same set 151-153 share the respective reoccurring resources 261-263. Where shared reoccurring resources 261-263 are employed, collision between data transmitted at the same can occur; e.g., two UEs 121-125 assigned to the same set may send data at the same time-frequency resource allocation 210. Here, it is possible that the eNB 130 and the respective UEs 121-125 execute a collision mitigation mechanism for data transmitted in the respective reoccurring resources 261-263. E.g., the collision mitigation mechanism can be selected from the group comprising: an automatic repeat request scheme; forward error correction; a carrier sense multiple access/collision detection; and/or orthogonal encoding.

Where only a small number of UEs 121-125 simultaneously send data in the same time-frequency resource allocation 210, orthogonally encoding the respective data can allow to successfully transmit the data. However, if too many UEs 121-125 simultaneously send data in the same time-frequency resource allocation 210, orthogonally encoding may not be able to avoid interference and loss of data.

Here, e.g. by means of legacy collision mitigation techniques, the UE 121-125 can be configured to wait for acknowledgment of the previously sent data.

Acknowledgments may include at least one of positive acknowledgments and negative acknowledgments. The acknowledgments can be used by the UE 121-125 to determine if sending of the data was successful, i.e., if the data has been successfully transmitted. In case no positive acknowledgment (ACK) is received and/or a negative acknowledgment (NACK) is received, the UE can resend the data. In order to avoid interference, it is possible to implement randomization of said resending of the data. E.g., a time-frequency resource allocation 210 for resending of the data can be randomly selected from the corresponding reoccurring resources 261-263.

In order to maintain resource fairness—i.e., preventing that some of the UEs 121-125 dominate resource usage, while other UEs 121-125 are excluded from resource usage—a random backoff mechanism can be used. In case successful transmission of data is not acknowledged, the UE 121-125 can wait for a certain random backoff time before resending the data. If, a certain number of attempts of resending the data, transmission remains unsuccessful, the UE can stop resending the data, wait for a new scheduling grant, or utilize alternative resources—such as dedicated resources allocated in response to a scheduling request for sending of the data.

Figure 6:
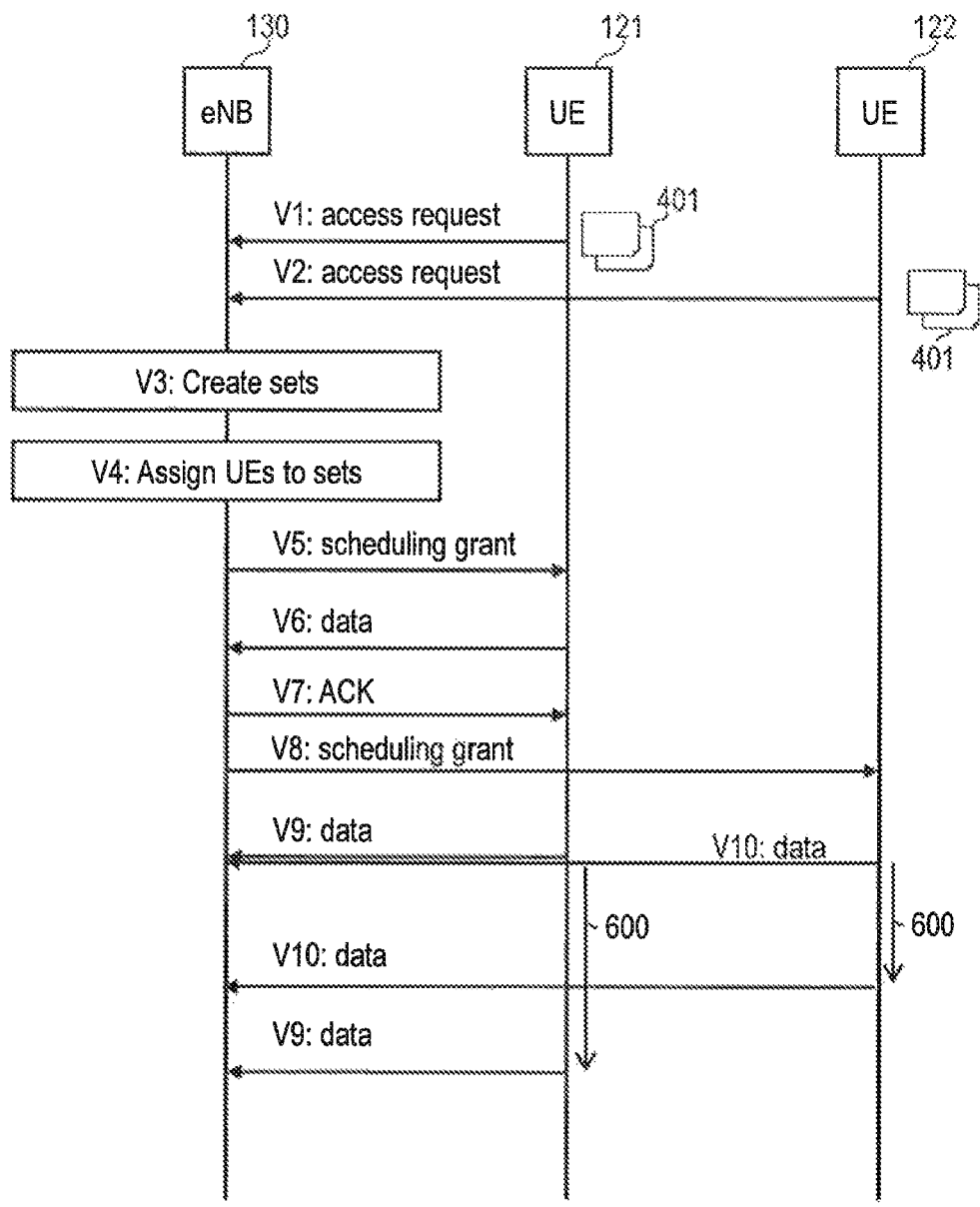
FIG. 6 is a signaling diagram according to various embodiments illustrating a collision interference technique.

A collision mitigation mechanism based on an automatic repeat request scheme employing positive acknowledgments is illustrated in FIG. 6. V1-V6 correspond to T1-T6 where the UE 122 is also assigned to the first set 151 at V4.

The data V6 is successfully received by the eNB 130; this is acknowledged by the eNB 130 by sending a ACK V7.

A scheduling grant V8 co-schedules the UEs 121, 122 in the first reoccurring resources 261 of the first set 151—i.e., the first reoccurring resources 261 are shared resources.

A collision occurs when UE 121 sends data V9 in a given time-frequency resource allocation 210 of the first reoccurring resources 261 and also the UE 122 send data V10 in the given time-frequency resource allocation 210 of the first reoccurring resources 261. Because of the collision, the data V9, V10 is not successfully received by the eNB 130. Because of this, the eNB 130 does not send any positive acknowledgments; alternatively or additionally, the enB 130 may send a negative acknowledgement.

Because the data V9, V10 is not positively acknowledged by the eNB 130, after random backoff times 600 the UEs 121, 122 re-send the data V9, V10. Due to the randomization of the backoff time 600, a collision is avoided when resending the data V9, V10.

In order to reduce a likelihood of collision, the UEs 121-125 that receive ACKs will, according to various embodiments, down-prioritize or wait its subsequent transmission. This allows the other UEs 121-125 that couldn't send data previously to do so.

With respect to FIG. 6, a technique has been discussed that allows mitigating the impact of collisions. In order to decrease a likelihood of collisions in the first place, it is possible that the sets 151-153 are created by taking into account a number of UEs 121-125 expected to be assigned to each set 151-153. E.g., if the number of UEs 121-125 assigned to a given set 151-153 exceeds a certain predefined threshold, it may be possible to split that given set 151-153 in two and/or distribute excess UEs 121-125 among other sets 151-153. This may correspond to establishing the corresponding set classification information 301 such that the requirements for assignment of a given UE 121-125 to the corresponding set are more strict—so that effectively a smaller number of UEs 121-125 fulfills the parameterized properties as indicated by the set classification information 301. Thus, generally, establishing the set classification information can consider a number of UEs 121-125 expected to be assigned to the corresponding set 151-153. E.g., in a scenario where too many UEs 121-125 attempt to transmit at the same timeslot, a new grouping of UEs 121-125 into the sets 151-153 can be conducted. I.e., the sets 151-153 can be re-created. The eNB 130 can, e.g., during registration of a UE 121-125 or during RRC reconfiguration, assign UEs 121-125 to different sets 151-153; thus the UEs 121-125 can be scheduled differently employing the scheduling grants S7, T5, T7, U6, V5, V8 that may be broadcasted. In this way, the cellular network 100 can handle variations in UE density and traffic load over time.

E.g., it is possible that the allocation of the reoccurring resources 261-263 is in response to UEs 121-125 attaching to the cellular network 100. Likewise, it is possible that the generation of the sets 151-153 is in response to UEs 121-125 attaching to the cellular network 100; e.g., the establishing of the set classification information 301 for the first set 151 and the second set 152 may be in response to the UEs 121-125 attaching to the cellular network 100.

Similar considerations may also apply to various further scenarios. E.g., with reference to FIG. 3: considering a case where the eNB 130 determines that, at the time of executing S3, already a comparably large number of UEs 121-125 is assigned to the created first and second sets 151, 152, the eNB 130 may re-execute S1 to create further sets so that the UEs 121, 123 can be assigned to the further sets that still have free capacity. Here, a threshold comparison of the number of UEs 121-125 assigned to existing sets and a predefined threshold may be executed. Further, with respect to FIGS. 4-7, steps T3, U3, V3: instead of creating new sets 151, 152, it is possible that the eNB 130 assigns the UEs 121, 122 to existing sets that still have free capacity for assigning additional UEs. On the other hand, if, e.g., a set has already a certain number of UEs 121-125 assigned thereto, the eNB 130 may create new sets.

Generally, it is possible that the previously created sets 151-153 are re-created/adjusted from time to time. Likewise, the corresponding set classification information 301 can be reestablished/adjusted from time to time. By such means, it is possible that the cellular network 100 responds to a variation in a number of UEs 121-125 connected to the cellular network 100, a variation of a density of UEs 121-125 connected to the cellular network, and/or a variation in traffic load over time. Such techniques may be included in traffic shaping approaches.

Figure 7:
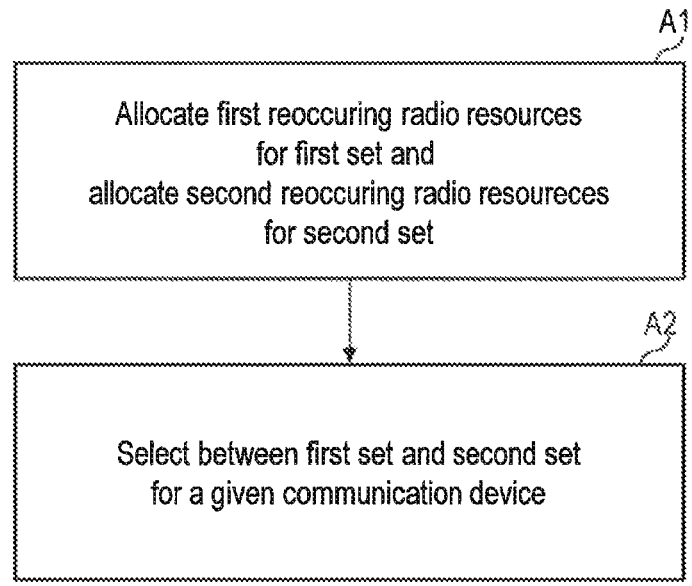
FIG. 7 is a flowchart of a method according to various embodiments.

In FIG. 7, a flowchart of a method according to various embodiments is illustrated. At A1, the first reoccurring resources 261 for the first set 151 and the second reoccurring resources 262 for the second set 152 are allocated on the radio interface 200. Typically, A1 is executed by the eNB 130.

Optionally, at A1, the corresponding set classification information 301 can be established for the first set 151 and the second set 152. Generally, it is possible to take into account various criteria when establishing the set classification information 301. For example, the set classification information 301 can parameterize at least one property of the UEs 121-125 that is selected from the group comprising: a traffic pattern of the UEs 121-125 assigned to the respective set 151-153; a QoS requirement of UEs 121-125 assigned to the respective set 151-153; a category of UEs 121-125 assigned to the respective set 151-153; a location within the cellular network 100 of UEs 121-125 assigned to the respective set 151-153; a channel quality of the radio interface 200 at UEs 121-125 assigned to the respective set 151-153; and a coverage requirement of UEs 121-125 assigned to the respective set 151-153.

For example, the coverage requirement of the UEs 121-125 can correspond to whether the respective UEs 121-125 are associated with normal coverage or different levels of enhanced coverage. Enhanced coverage may require an increased transmission power when communicating with the respective UEs 121-125.

The channel quality of the radio interface 200 can correspond to radio related parameters such as received signal strength or quality information of the radio interface 200. E.g., a channel quality indicator can be taken into account.

The location within the cellular network 100 as mentioned above can be specified e.g. on cell-level or sub-cell level. Thereby, it becomes possible to group UEs 121-125 in the same set 151-153 that are within the same location area.

A category of the UEs 121-125 can correspond to device description types or features of the UE 121-125. E.g., the UE 121-125 can be one of a mobile phone, a smartphone, a tablet, a personal digital assistant, a mobile music player, a smart watch, a wearable electronic equipment, a smart meter, a sensor, an actuator, and a mobile computer depending on the corresponding type of the UE 121-125, it is possible to assign a given UE 121-125 to a particular set 151-153. E.g., all sensors may be assigned to a first set 151; while all actuators are assigned to as second set 152.

Different types of UEs 121-125 can provide different types of data. The different types of data can correspond to different services such as Voice-over-IP, best effort data, high-priority data, etc. Depending on the type of data, different QoS requirements typically need to be fulfilled when transmitting the data. These QoS requirements associated with the type of data of a given UE 121-125 can be taken into account when establishing the set classification information as a corresponding property of the UE 121-125.

A feature capability of the UEs 121-125 can correspond to certain limitations and possibilities in types and classes of data to be transmitted. E.g., if certain UEs 121-125 cannot transmit in a given frequency band, or if certain UEs 121-125 only allow to transmit small data, such limitations of the capability should be taken into account when establishing the set classification information 301 which determines the grouping into the different sets 151-153.

The traffic pattern of the UEs 121-125 can correspond to a periodicity or frequency of occurrence with which data to be transmitted is expected to occur, a size of individual data blocks to be transmitted, an overall size of data, peak times for data to be transmitted, etc. E.g., while some UEs 121-125 may require a constant stream of small chunks of data, other UEs 121-125 could require only seldom transmission of large chunks of data. E.g., while a first UE 121-125 needs to transmit data at a comparably low, but constant data rate of, e.g., 20 kilobit per second, a second UE 121-125 might require sending of a status report having a large file size of 50 MB, e.g., once per day at 12 pm. Such traffic patterns can be taken into account when establishing the effect classification information 301 that determine the grouping into the different sets 151-153.

Above, it has been explained that when establishing the set classification information 301 various properties of the UEs 121-125 can be taken into account. Generally, it is possible to take into account these properties when allocating the corresponding reoccurring resources 261-263 of the various sets 151-153. E.g., depending on the traffic pattern, a larger/smaller number of time-frequency resource allocations 210 could be allocated by the respective reoccurring resources. Likewise, depending on the capability and/or category of the UE 121-125, a different number of resource allocations 210 could be allocated by the respective reoccurring resources 261-263. E.g., if the QoS requirements indicates that a small latency is needed for transmission of data, time-frequency resource allocations 210 can be scheduled at a comparably high density on the radio interface 200; by this, it is ensured that, after data arrives in a transmit buffer of the UE 121-125, the time until the next allocated time-frequency allocation 210 is comparably small. Thus, generally, by appropriately allocating the reoccurring resources 261-263 on the radio interface 200, it is possible to grant prioritization of certain sets 151-153 over other sets 151-153.

Turning again to FIG. 7, at A2, it is selected between the first set 151 and the second set 152 for a given UE 121-125. Generally, it is possible that A2 is executed by the eNB 130 and/or the given UE 121-125. Generally, A2 may comprise comparing the current value 401 of the at least one property of a given UE 121-125 with the parameterized at least one property as indicated by the set classification information 301. E.g., here it may be determined if the current value 401 falls within a respective range as indicated by the set classification information 301 or fulfills certain requirements.

Figure 8:
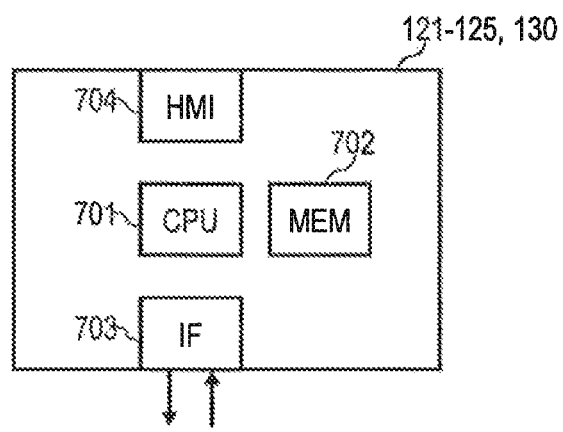
FIG. 8 schematically illustrates devices according to various embodiments.

FIG. 8 is a schematic illustration of a device 121-125, 130, i.e., A UE 121-125 and the eNB 130, according to various embodiments. The device 121-125, 130 comprises a processor 701. E.g., the processor 701 can be a multicore processor. It is also possible to employ shared computing. Further, the device 121-125, 130 comprises a memory 702, e.g., a non-volatile memory. The memory 702 comprises control instructions that can be executed by the processor 701. Executing the control instructions causes the processor 701 to perform the techniques as illustrated above. E.g., the control instructions can cause the processor 701 to create the sets 151-153, allocate the corresponding reoccurring resources 261-263, and/or select between the created sets 151-153. The device 121-125, 130 further comprises an interface 703. The interface 703 can send and/or receive (transmit) data on the radio interface 200 of the cellular network 100. Further, the device 121-125, 130 comprises a human machine interface (HMI). The HMI 704 can input instructions from a user and/or output instructions to a user.

As explained above with respect to the various embodiments, it is possible that the scheduling grant S2, S3, S7, T5, T7, U5, U7 is sent employing a unicast transmission or a broadcast transmission 110. Generally, it is possible that a dedicated scheduling grant S2, S3, S7, T5, T7, U5, U7 is broadcasted for each set 151-153; such a dedicated scheduling grant S2, S3, S7, T5, T7, U5, U7 may only include the first set information 301 if required. Further, such a dedicated scheduling grant S2, S3, S7, T5, T7, U5, U7 may be selectively broadcasted to those UEs 121-125 that belong to the respective set 151-153. In other embodiments, the scheduling grant S2, S3, S7, T5, T7, U5, U7 may be broadcasted to all UEs 121-125. Generally, the scheduling grant S2, S3, S7, T5, T7, U5, U7 may be sent as part of a System Information Block (SIB).

While above various techniques have been described primarily with respect to the MTC technology, generally it should be understood that such techniques may be readily applied to different types and kinds of cellular networks.

The invention claimed is:

1. A device, comprising:
   a wireless interface configured to transmit data on a radio interface of a cellular network,
   at least one processor configured to receive, via the wireless interface, at least one control message, said at least one control message indicating a first reoccurring resource associated with a first set of communication devices and a second reoccurring resource associated with a second set of communication devices and further indicating set classification information for the first set and the second set,
   wherein the set classification information parameterizes assignment of communication devices to the first set and the second set,
   wherein the at least one processor is further configured to select between the first reoccurring resources and the second reoccurring resources based on the set classification information,
   wherein the set classification information parameterizes a coverage level of communication devices assigned to the first set and/or the second set,
   wherein the received at least one control message is a series of control messages, each indicating a first reoccurring resource associated with the first set of communication devices, a second reoccurring resource associated with the second set of communication devices, and set classification information for the first set and the second set;
   wherein the at least one processor further configured to determine that the set classification information is revised between two successive control messages to dynamically change association of communication devices with the first and second sets of communication devices according to the parameterized coverage level; and
   wherein the selection between the first reoccurring resources and the second reoccurring resources is based on the revised set classification information and a current value of the device for the coverage level.

2. The device of claim 1,
   wherein the set classification information further parameterizes a property of communication devices selected from the group comprising:
   a traffic pattern of communication devices assigned to the first set and/or the second set;
   a feature capability of communication devices assigned to the first set and/or the second set;
   a quality-of-service requirement of communication devices assigned to the first and/or the second set;
   a category of communication devices assigned to the first set and/or the second set;
   a location within the cellular network of communication devices assigned to the first set and/or the second set; and
   a channel quality of the radio interface at communication devices assigned to the first set and/or the second set;
   wherein the at least one processor is configured to determine a current value of the at least one property.

3. The device of claim 2,
   wherein the at least one processor is configured to send, via the wireless interface, a control message, said control message indicating the current value of the at least one property.

4. The device of claim 1,
   wherein the device is a communication device of a group comprising a mobile phone, a smartphone, a tablet, a personal digital assistant, a mobile music player, a smart watch, a wearable electronic equipment, a smart meter, a sensor, an actuator, and a mobile computer.

5. The device of claim 1,
   wherein the indicated first reoccurring resources are first reoccurring uplink time-frequency resources on the radio interface and shared among the first set of communications devices being of two or more communications devices connected to a first cell of the cellular network, the communication devices of the first set being co-scheduled to the first reoccurring uplink time-frequency resources which correspond to multiple time-offset first transmission opportunities, and
   wherein the indicated second reoccurring resources are second reoccurring uplink time-frequency resources on the radio interface and shared among the second set of communications devices being of two or more communications devices connected to the first cell of the cellular network, the communication devices of the second set being co-scheduled to the second reoccurring uplink time-frequency resources which correspond to multiple time-offset second transmission opportunities.

6. A method carried out in a device, comprising:
   receiving at least one control message indicating a first reoccurring resource associated with a first set of communication devices, a second reoccurring resource associated with a second set of communication devices, and set classification information for the first set and the second set, wherein the set classification information parameterizes assignment of communication devices to the first set and the second set, selecting between the first reoccurring resources and the second reoccurring resources based on the set classification information, wherein the set classification information parameterizes a coverage level of communication devices assigned to the first set and/or the second set, wherein the received at least one control message is a series of control messages, each indicating a first reoccurring resource associated with the first set of communication devices, a second reoccurring resource associated with the second set of communication devices, and set classification information for the first set and the second set;

determining that the set classification information is revised between two successive control messages to dynamically change association of communication devices with the first and second sets of communication devices according to the parameterized coverage level; and wherein the selecting between the first reoccurring resources and the second reoccurring resources is based on the revised set classification information and a current value of the device for the coverage level.

7. The method of claim 6, wherein the method is executed by a communications device having a wireless interface configured to transmit data on a radio interface of a cellular network.

8. The method of claim 7, wherein the communications device is selected from a group comprising a mobile phone, a smartphone, a tablet, a personal digital assistant, a mobile music player, a smart watch, a wearable electronic equipment, a smart meter, a sensor, an actuator, and a mobile computer.

9. The method of claim 6, wherein the indicated first reoccurring resources are first reoccurring uplink time-frequency resources on the radio interface and shared among the first set of communications devices being of two or more communications devices connected to a first cell of the cellular network, the communication devices of the first set being co-scheduled to the first reoccurring uplink time-frequency resources which correspond to multiple time-offset first transmission opportunities, and wherein the indicated second reoccurring resources are second reoccurring uplink time-frequency resources on the radio interface and shared among the second set of communications devices being of two or more communications devices connected to the first cell of the cellular network, the communication devices of the second set being co-scheduled to the second reoccurring uplink time-frequency resources which correspond to multiple time-offset second transmission opportunities.

10. The method of claim 6, wherein the set classification information further parameterizes a property of communication devices selected from the group comprising:

a traffic pattern of communication devices assigned to the first set and/or the second set;

a feature capability of communication devices assigned to the first set and/or the second set;

a quality-of-service requirement of communication devices assigned to the first and/or the second set;

a category of communication devices assigned to the first set and/or the second set;

a location within the cellular network of communication devices assigned to the first set and/or the second set; and a channel quality of the radio interface at communication devices assigned to the first set and/or the second set;

the method further comprising determining a current value of the at least one property.

11. The method of claim 10, further comprising sending a control message indicating the current value of the at least one property.

* * * * *